July 30, 1968  H. A. TRAUB  3,394,941
SEALING RING ASSEMBLY
Filed Oct. 21, 1965
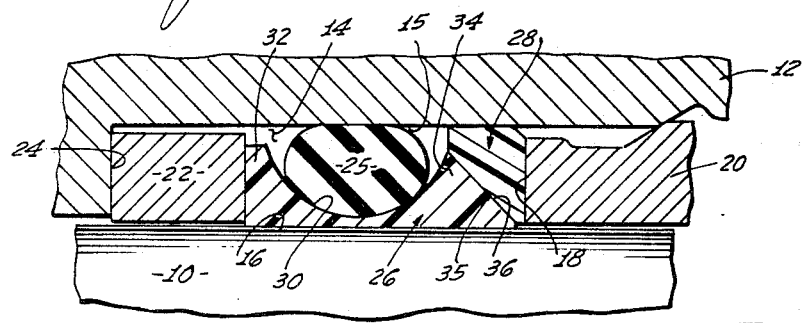
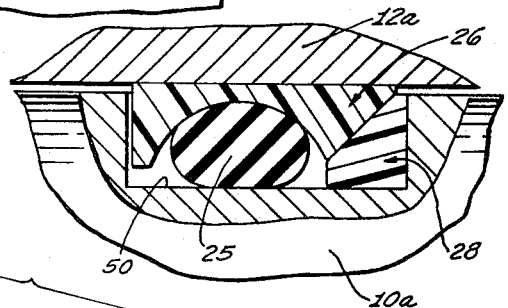
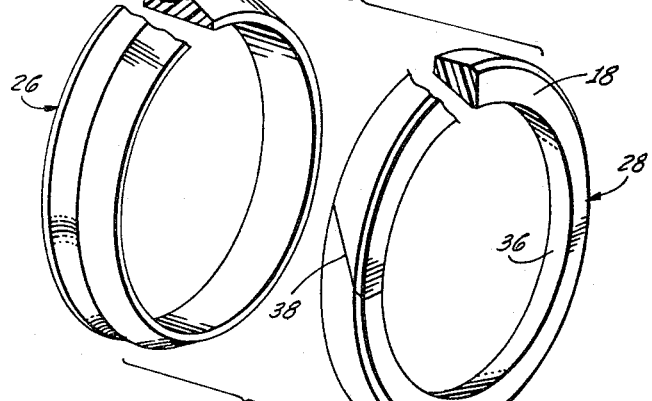
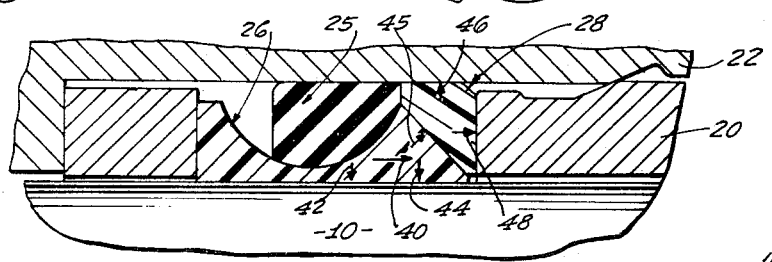
INVENTOR:
Henry A. Traub
By Smyth, Roston & Pavitt
Attorneys

United States Patent Office 3,394,941
Patented July 30, 1968

3,394,941
SEALING RING ASSEMBLY
Henry A. Traub, Pacific Palisades, Calif., assignor to W. S. Shamban & Company, Los Angeles, Calif., a corporation of California
Filed Oct. 21, 1965, Ser. No. 499,964
7 Claims. (Cl. 277—144)

ABSTRACT OF THE DISCLOSURE

This disclosure describes a sealing assembly for use in an annular space between inner and outer concentric structures. The sealing assembly may include an elastomeric ring, a first nonelastomeric ring engageable with the elastomeric ring, and a second nonelastomeric ring. The first nonelastomeric ring isolates the elastomeric ring from one of the concentric structures and the nonelastomeric rings cooperate to prevent harmful extrusion of the elastomeric ring.

---

This invention relates to a three-ring sealing assembly for use in an annular space to oppose fluid pressure in a forward axial direction between an inner member and a concentric surrounding structure, wherein the inner member provides the inner circumferential boundary surface of the annular space and the outer structure provides the outer circumferential boundary surface. For example, the inner member may be a shaft that either rotates or reciprocates longitudinally and the outer concentric structure may be fixed structure surrounding the shaft.

A three-ring sealing assembly of the general type to which the invention pertains comprises a relatively soft resiliently deformable elastomeric ring, such as a conventional O-ring, in combination with a pair of relatively hard nonelastomeric sealing rings positioned to one side of the elastomeric ring to be subjected to axial pressure by the elastomeric ring. In a well known prior art arrangement, the elastomeric ring occupies the whole radial dimension of the annular space, the ring being under radial compression between the shaft and the surrounding fixed structure. The two nonelastomeric rings cooperate to span the radial dimension of the annular space to block any tendency for the elastomeric ring to be extruded under fluid pressure. For this last purpose, the pair of nonelastomeric rings are tapered with cooperating wedge surfaces for radial expansion of the two rings jointly to follow changes in the radial dimension of the annular space, for example changes created by wear and changes created by thermal expansion and contraction.

The present invention is based on the finding that the service life of such a sealing assembly is shortened if the elastomeric ring makes contact with two different relatively movable metal surfaces. For example, in the described prior art arrangement, the elastomeric ring or O-ring makes contact both with the metal of the shaft and the metal of the surrounding fixed structure. If the ring remains stationary relative to one of the two metal surfaces it is worn or abraded by the other metal surface.

The invention achieves a longer service life as well as higher sealing efficiency by employing one of the two relatively nonelastomeric rings to space the relatively soft elastomeric ring from one of the two concentric metal surfaces and does so without sacrificing the wedging cooperation of the two relatively hard nonelastomeric rings that prevents extrusion of the relatively soft elastomeric ring. In the new arrangement the soft elastomeric ring is either an outer ring embracing a first one of the two harder rings or is an inner ring embraced by the first one harder ring. The second of the two harder rings which may conveniently be termed the wedge ring makes contact with one of the two concentric metal surfaces and backs against a gland or the equivalent at one end of the annular space between the two concentric metal surfaces.

A feature of the invention is that the wedge ring overhangs the forward end of the other nonelastomeric ring and thus keeps the other nonelastomeric ring spaced from the inner end of the gland.

The features and advantages of the invention may be understood from the following detailed description and the accompanying drawing.

In the drawing which is to be regarded as merely illustrative:

FIG. 1 is a longitudinal sectional view of the presently preferred embodiment of the invention;

FIG. 2 is a perspective view of the two nonelastomeric rings shown in FIG. 1;

FIG. 3 is a view similar to FIG. 1 showing the behavior of the sealing assembly under high fluid pressure; and FIG. 4 is a view similar to FIG. 1 showing a reversal of the three-ring assembly.

In FIG. 1 a movable shaft 10 is surrounded by fixed outer structure 12 which forms therewith an annular space 14 having an outer circumferential surface 15 and an inner circumferential surface 16. The pressure of the fluid that is confined by the sealing assembly is from left to right as shown in FIG. 1 which direction may be referred to as the forward axial direction. The fluid pressure is directed against a forward end surface 18 of the annular space 14, which end surface is formed by the end of a gland 20. The gland 20 may be a floating gland or may be adjustably mounted on the outer fixed structure by screw threaded engagement therewith. In the construction shown, a spacer ring 22, which may be omitted is at the opposite end of the annular space, the spacer ring backing against an inner circumferenttial shoulder 24 of the outer fixed structure.

The three rings of the annular sealing assembly comprise an outer relatively soft elastomeric ring 25, a first nonelastomeric ring 26 and a second nonelastomeric ring or wedge ring 28. The outer ring 25 is made of relatively soft elastomeric material such as neoprene and in this instance is in the form of an O-ring, the unrestrained radial cross section of the O-ring being circular. As may be seen in FIG. 1 the O-ring 25 is deformed under radial compression between the inner ring 26 and the outer circumferential surface 15. The rings 26 and 28 may be made of a fluorocarbon and may be reinforced by embedded fibres.

The first nonelastomeric ring 26 is embraced by the outer O-ring 25 and preferably, but not necessarily, is formed with a concave outer circumferential surface 30 which serves as a saddle to seat the outer O-ring and which provides shoulders 32 and 34 on the opposite sides respectively of the outer O-ring. It is apparent that the two shoulders 32 and 34 in straddling the outer O-ring 25 tend to center the O-ring relative to the ring 26 and make the ring 26 movable axially in response to fluid pressure against the O-ring. Since the shoulder 34 is a projection of the inner ring 26 on the forward side of the outer elastomeric ring 25, it is apparent that fluid pressure against the outer elastomeric ring will cause the outer elastomeric ring to thrust against the inner ring 26. It is to be noted that the unrestrained cross-sectional curvature of the outer O-ring 25 is greater than the curvature of the concave surface 30, which is to say that the radius of curvature of the cross-sectional configuration of the O-ring is less than the radius of curvature of the concave surface. Since the O-ring 25 is under radial compression it is flattened to spread laterally along the concave surface 30.

The first nonelastomeric ring 26 is formed on its forward side with an outer circumferential surface 35 of conical shape, the surface being inclined rearwardly relative to the axis of the assembly. Thus the forward side of the ring 26 is tapered for wedging action against the second nonelastomeric ring or wedge ring 28.

The wedge ring 28 has an inner circumferential conical surface 36 which mates with the outer conical surface 35 of the ring 26. It is to be noted that the wedge ring 28 overhangs the forward side of the ring 26 to keep the ring 26 spaced from the gland 20. Preferably the wedge ring 28 is split along a diagonal line 38 as indicated in FIG. 2 to provide two tapered ends so that the wedge ring may be expanded in diameter without forming a gap between the two ends.

FIG. 3 shows how the described sealing assembly behaves under high fluid pressure. The outer O-ring 25 is shifted to the right eliminating all voids on the forward side of the ring. Since the first nonelastomeric ring 26 by virtue of its concave cross-sectional configuration partially envelops the outer O-ring 25 on the forward side thereof, the outer O-ring thrusts axially against the ring 26 to urge the ring 26 in the axial direction indicated by the arrow 40. At the same time, by virtue of the curvature of the arcuate concavity of the ring 26, the outer O-ring 25 wedges the ring 26 radially inwardly into sealing pressure against the shaft 10 as indicated by the arrow 42.

The axial thrust of the ring 26 that is indicated by the arrow 40 is resolved by wedging action into two components, one component being radially inwardly as indicated by the arrow 44 to create inward sealing pressure against the shaft 10, the other of the two components being inclined outward as indicated by the arrow 45 against the wedge ring 28. The force represented by the arrow 45 is, in turn, resolved into two components of reaction by the wedge ring, one component being radially outward as indicated by the arrow 46 and the other component being in the axial direction against the gland 20 as indicated by the arrow 48.

It is apparent that the wedging relationship between the ring 26 and the wedge ring 28 makes the two rings jointly capable of expansion and contraction in overall radial dimension to conform with any changes that may occur in the radial dimension of the annular space 14. Expansion of the wedge ring 28 is accomplished by slippage of its confronting tapered ends without opening up a gap through which the outer O-ring 25 might be extruded.

It can be seen in FIGS. 2 and 3 that the sole metal surface contacted by the outer O-ring 25 is the surrounding surface of the fixed outer structure 12 and that the only metal surface contacted by the inner nonelastomeric ring 26 is the surface of the shaft 10. The wedge ring 28 makes contact only with the fixed structure 12 and the gland 20. Thus none of the three rings make simultaneous contact with the two relatively movable surfaces 15 and 16 and this fact accounts for the increased service life of the sealing assembly that is provided by the described relationships among the parts.

In FIG. 4 the same three-ring assembly comprising the O-ring 25 and the two nonelastomeric rings 26 and 28 is reversed, the assembly being mounted in a circumferential groove 50 in a shaft 10a instead of being mounted in a circumferential groove in the surrounding outer structure 12a. It is apparent that the three-ring assembly with the first nonelastomeric ring 26 embracing the O-ring 25 instead of the O-ring embracing the first nonelastomeric ring will function in the manner heretofore described.

My description in specific detail of the selected embodiment of the invention will suggest various changes, substitutions and other departures within the spirit and scope of the appended claims.

I claim:

1. A sealing assembly in an annular space to oppose fluid pressure in a forward axial direction between a concentric outer structure and a concentric inner structure wherein the annular space has an inner circumferential surface, an outer circumferetial surface and a forward end surface, comprising:
   an elastomeric ring in contact with one of said two circumferential surfaces of the annular space;
   a first nonelastomeric ring in contact with the other of said two circumferential surfaces of the annular space,
   said first nonelastomeric ring being interposed between the elastomeric ring and said other of the two circumferential surfaces to keep the elastomeric ring out of contact with said other of the two circumferential surfaces, said first nonelastomeric ring having a generally concave surface confronting said elastomeric ring and forming a saddle therefor; and
   a second nonelastomeric ring on the forward side of the elastomeric ring in contact with said one of the two circumferential surfaces and in contact with said end surface of the annular space,
   said elastomeric ring being in radial compression between the first nonelastomeric ring and said one of the two circumferential surfaces,
   said first nonelastomeric ring having a projecting forward end portion which is prevented from substantially contacting said one surface by said second nonelastomeric ring whereby said first and second nonelastomeric rings cooperate to span the radial dimension of the annular space on the forward side of the elastomeric ring,
   said first and second nonelastomeric rings having cooperating conical surfaces for mutual wedging action whereby the fluid pressure against the first nonelastomeric ring and the pressure of the elastomeric ring against the second nonelastomeric ring causes the first and second nonelastomeric rings to cooperate by wedging action to block extrusion of the elastomeric ring.

2. A sealing assembly as set forth in claim 1 in which said second nonelastomeric ring overhangs the forward end portion of the first nonelastomeric ring to keep the first nonelastomeric ring out of contact with said end surface of the annular space.

3. A sealing assembly as set forth in claim 1 in which said first and second nonelastomeric rings are made of a fluorocarbon.

4. A sealing assembly as set forth in claim 3 in which said first and second nonelastomeric rings are reinforced by embedded fibres.

5. A sealing assembly as set forth in claim 1 in which said second nonelastomeric ring is a split ring with overlapping tapered ends to permit expansion in diameter without the formation of a gap between the ends.

6. A sealing assembly in an annular space to oppose fluid pressure in a forward axial direction between a concentric outer structure and a concentric inner structure wherein the annular space has an inner circumferential surface, an outer circumferential surface and a forward end surface, comprising:
   an outer elastomeric ring in contact with said outer circumferential surface of the annular space;
   a first nonelastomeric ring in contact with said inner circumferential surface of the annular space, said first nonelastomeric ring being spaced from said outer circumferential surface of the annular space; and
   a second nonelastomeric ring on the forward side of the outer elastomeric ring in contact with said outer circumferential surface and said end surface of the annular space, said second nonelastomeric ring filling the space between said first nonelastomeric ring and said outer circumferential surface of the annular space, said outer elastomeric ring embracing said first nonelastomeric ring under radial compression and being spaced from the inner circumferential surface by the first nonelastomeric ring, said second nonelastomeric ring cooperating with the first nonelastomeric ring to span the radial dimension of the annular space on the forward side of the outer ring, a portion of said first nonelastomeric ring projecting on the forward side of the outer ring to be urged forwardly by the outer ring in response to fluid pressure against the outer ring, said portion being out of substantial contact with said outer circumferential surface and defining a conical surface, said second nonelastomeric ring having a conical surface for mutual wedging action with said conical surface of said first nonelastomeric ring whereby the fluid pressure against the first nonelastomeric ring and the pressure of the elastomeric ring against the two nonelastomeric rings causes the two nonelastomeric rings to cooperate by wedging action to block extrusion of the elastomeric ring, each of said first and second nonelastomeric rings having an insufficient radial dimension to contact both of said circumferential surfaces simultaneously.

7. A sealing assembly in an annular space to oppose fluid pressure in a forward axial direction between a concentric outer structure and a concentric inner structure wherein the annular space has an inner circumferential surface, an outer circumferential surface and a forward end surface, comprising:

an inner elastomeric ring in contact with said inner circumferential surface of the annular space;

a first nonelastomeric ring in contact with said outer circumferential surface of the annular space, said first nonelastomeric ring being spaced from said inner circumferential surface of the annular space; and a second nonelastomeric ring on the forward side of the inner elastomeric ring in contact with said inner surface and said end surface of the annular space, said second nonelastomeric ring filling the space between said first nonelastomeric ring and said inner circumferential surface of the annular space, said first nonelastomeric ring embracing said inner elastomeric ring to keep the inner elastomeric ring out of contact with said outer circumferential surface, said inner elastomeric ring being under radial compression between the first nonelastomeric ring and the inner circumferential surface, a portion of said first nonelastomeric ring projecting on the forward side of the inner elastomeric ring and defining a conical surface, said second nonelastomeric rings having a conical surface for mutual wedging action with said conical surface of said first nonelastomeric ring whereby the fluid pressure against the first nonelastomeric ring and the pressure of the inner elastomeric ring against both of the nonelastomeric rings causes the two nonelastomeric rings to cooperate to block extrusion of the elastomeric ring, each of said first and second nonelastomeric rings having an insufficient radial dimension to contact both of said circumferential surfaces simultaneously.

References Cited
UNITED STATES PATENTS

| | | | |
|---|---|---|---|
| 2,567,527 | 9/1951 | Parks | 277—110 |
| 2,968,501 | 1/1961 | Tisch | 277—177 |
| 2,998,987 | 9/1961 | Taschenberg et al. | 277—153 X |
| 3,218,087 | 11/1965 | Hallesy | 277—165 X |

FOREIGN PATENTS 959,938  6/1964  Great Britain.

LAVERNE D. GEIGER, *Primary Examiner.*

J. S. MEDNICK, *Assistant Examiner.*